United States Patent
Jung et al.

(10) Patent No.: US 7,692,150 B2
(45) Date of Patent: Apr. 6, 2010

(54) REAL TIME IMAGING EXPANDABLE PASSIVE MILLIMETER WAVE SYSTEM FOR DETECTING CONCEALED OBJECTS

(75) Inventors: Kyung-Kwon Jung, Seoul (KR); Jin-Koo Rhee, Seoul (KR)

(73) Assignee: Eltronix Co., Inc., Seoul (KR)

( * ) Notice: Subject to any disclaimer, the term of this patent is extended or adjusted under 35 U.S.C. 154(b) by 123 days.

(21) Appl. No.: 12/072,533

(22) Filed: Feb. 26, 2008

(65) Prior Publication Data

US 2009/0212988 A1    Aug. 27, 2009

(51) Int. Cl.
G01J 5/00    (2006.01)
(52) U.S. Cl. .................................... 250/338.1
(58) Field of Classification Search ............... 250/332, 250/341.1, 338.1; 342/22, 176, 179
See application file for complete search history.

(56) References Cited

U.S. PATENT DOCUMENTS 6,094,472 A    7/2000    Smith
7,123,185 B2    10/2006    Fleisher et al.
2004/0080315 A1 *    4/2004    Beevor et al. ............... 324/244

* cited by examiner

Primary Examiner—David P Porta
Assistant Examiner—Mark R Gaworecki
(74) Attorney, Agent, or Firm—Blakely, Sokoloff, Taylor & Zafman LLP

(57) ABSTRACT

A passive millimeter wave system of this invention is comprised of; human body detector sensors which detect human bodies passing a scanner; passive millimeter wave image sensor modules arranged horizontally or vertically to acquire millimeter wave images radiated from human body in horizontal and vertical axes at certain time intervals; amplifier which amplifies the DC voltage from passive millimeter image sensor modules to a certain level; analog-digital converter which transforms the amplified DC voltage to digital signals; mobility detector which detects movement of human body passing predetermined position to acquire millimeter wave signals from human body; digital signal processor which interlinks and reconstructs signals with the time and position of the object obtained from mobility detector and the signals obtained by passive millimeter image sensor modules; monitor which displays the image of the signals processed with digital signal processor.

7 Claims, 5 Drawing Sheets

121   122   123   124

125   123   124

REAL TIME IMAGING EXPANDABLE PASSIVE MILLIMETER WAVE SYSTEM FOR DETECTING CONCEALED OBJECTS

FIELD OF THE INVENTION

This invention relates to a real time imaging expandable passive millimeter wave system for detecting concealed objects. In more particular, a real time imaging passive millimeter wave system which provides images of objects without affecting human body by detecting millimeter waves radiated from objects, and can be expanded into a real-time-based imaging system.

BACKGROUND OF THE INVENTION

The conventional imaging systems using millimeter wave (approximately 25 GHz~300 GHz) acquire signals by scanning the images of objects obtained with lenses or other methods using image sensors and construct the signals into images. Such systems may invade privacy by providing clear images of human bodies under clothes and affect human health by scanning human bodies with X-rays.

BRIEF SUMMARY OF THE INVENTION

This invention is presented to solve the problems of the past technologies by providing a system which can detect concealed objects in human bodies using passive millimeter wave sensors and mobility sensors which are installed in a row, to acquire millimeter wave images which are reconstructed with the parts detected according to the movement of the human body, interconnecting the signals of the positions and parts of the object. The system in accordance with the invention has a simple structure and can be expanded into a real-time-based imaging system.

In addition, another object of the invention is to reconstruct a whole body image with the millimeter waves passively detected in horizontal or vertical direction at certain time intervals while the human passes through the scanner. The millimeter image sensor modules are installed in a row on the scanner to provide a passive millimeter wave detector for concealed objects which can be expanded into a real-time-based imaging system.

To this end, the invention is characterized by being comprised of; human body detector sensors which detect human bodies passing a scanner; passive millimeter wave image sensor modules which are arranged horizontally or vertically on the scanner to acquire millimeter wave images radiated from human body in horizontal and vertical axes at certain time intervals; an amplifier which amplifies the DC voltage from said passive millimeter image sensor modules to a certain level; an analog-digital(A/D) converter which transforms the amplified DC voltage to digital signals; a mobility detector which detects the movement of human body passing predetermined position to acquire millimeter wave signals from divided parts of human body; a digital signal processor which interlinks and reconstructs signals with the time and position of the object obtained from said mobility detector and the signal obtained by said passive millimeter image sensor modules, and; a monitor which displays the signals processed with said digital signal processor.

In addition, said passive millimeter wave image sensor modules are characterized by being configured to be installed on scanners vertically or horizontally to detect the millimeter waves radiated from human body at certain time intervals, horizontally.

In addition, said passive millimeter wave image sensor modules are characterized by being comprised of; an antennal which has a lens which receives the millimeter waves radiated in accordance with temperature of the object; a low noise amplifier which amplifies the signals obtained with said antenna up to a certain level, and; a converter which converts the signals amplified with said amplifier into DC voltage.

In addition, said passive millimeter wave image sensor modules are characterized by being comprised of; a Cassegrain antenna which receives the millimeter waves radiated in accordance with temperature of the object; a low noise amplifier which amplifies the signals obtained with said Cassegrain antenna up to a certain level, and; a converter which converts the signals amplified with said amplifier into DC voltage.

In addition, the system is characterized by controlling the digital signals converted with said A/D converter with a micro-controller unit (MCU) for RS-485 communication protocol which is easily scalable.

In addition, the system is characterized by multiple sensors (10A~10E) arranged at desired positions to obtain partial images of a human body to enable the detection according to the position of the human body (object).

DETAILED DESCRIPTION OF THE INVENTION

The functions and their effects of the said members set forth and described hereinabove are described herein below with reference to the attached drawings.

Figure 1:
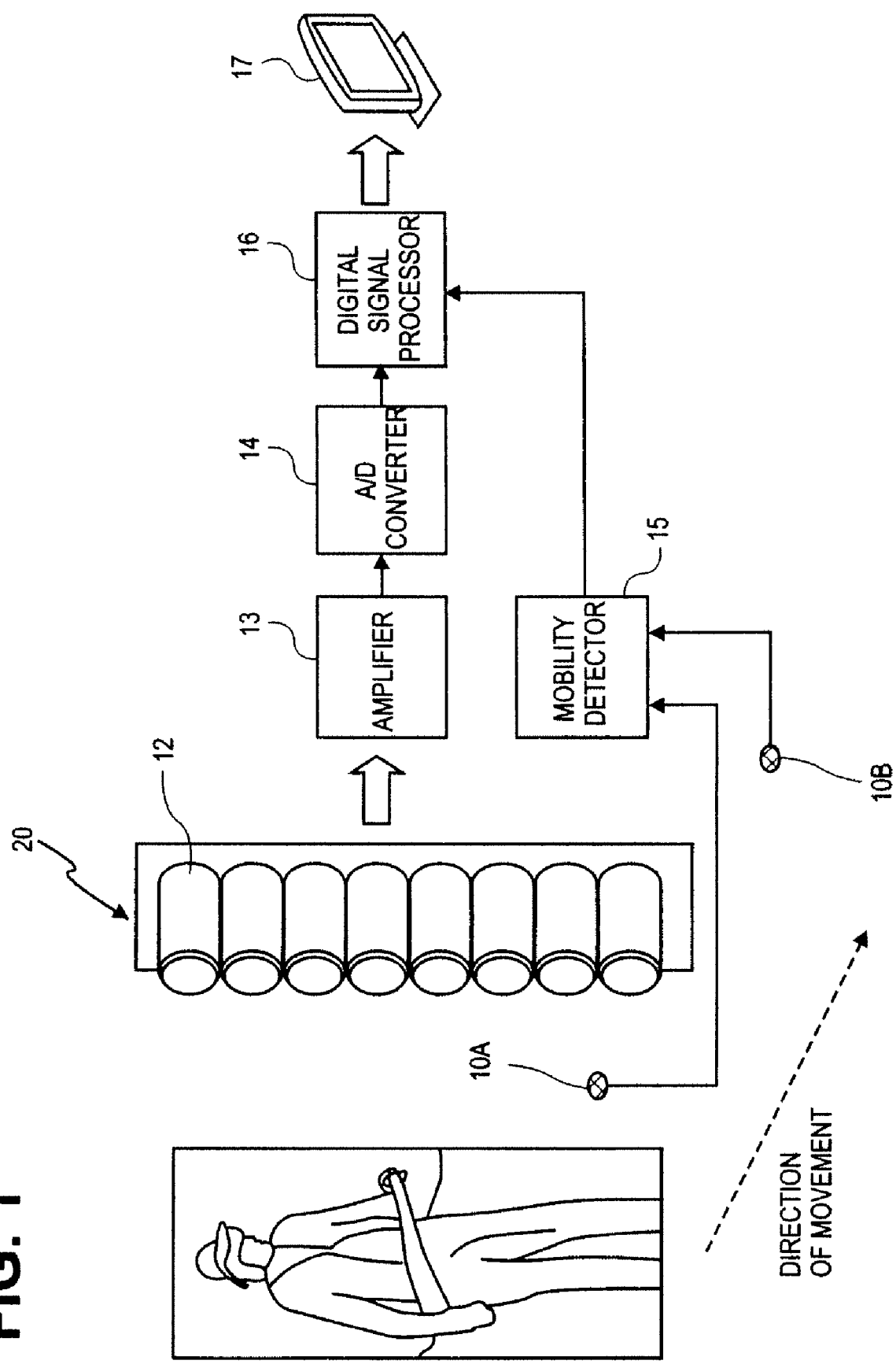
FIG. 1 is an exemplary and conceptual drawing of the concealed object detecting system in accordance with this inventions where the passive millimeter wave image sensors are installed vertically.

FIG. 1 shows a conceptual drawing of a concealed object scanner in accordance with the invention which is installed with passive millimeter wave image sensor modules in vertical direction. As shown in the FIG. 1, the system consists with; human body detector sensors (10A, 10B) which detect human bodies passing a scanner (20); passive millimeter wave image sensor modules (12) which are arranged horizontally or vertically on the scanner to acquire millimeter wave images radiated from human body in horizontal and vertical axes at certain time intervals; an amplifier (13) which amplifies the DC voltage from said passive millimeter image sensor modules (12) to a certain level; an analog-digital (A/D) converter (14) which transforms the amplified DC voltage to digital signals; a mobility detector (15) which detects the movement of human body passing predetermined position to acquire millimeter wave signals from divided parts of human body; a digital signal processor (16) which interlinks and reconstructs signals with the time and position of the object obtained from said mobility detector (15) and the signal obtained by said passive millimeter image sensor modules (12), and; a monitor which displays the signals processed with said digital signal processor (16).

Figure 2:
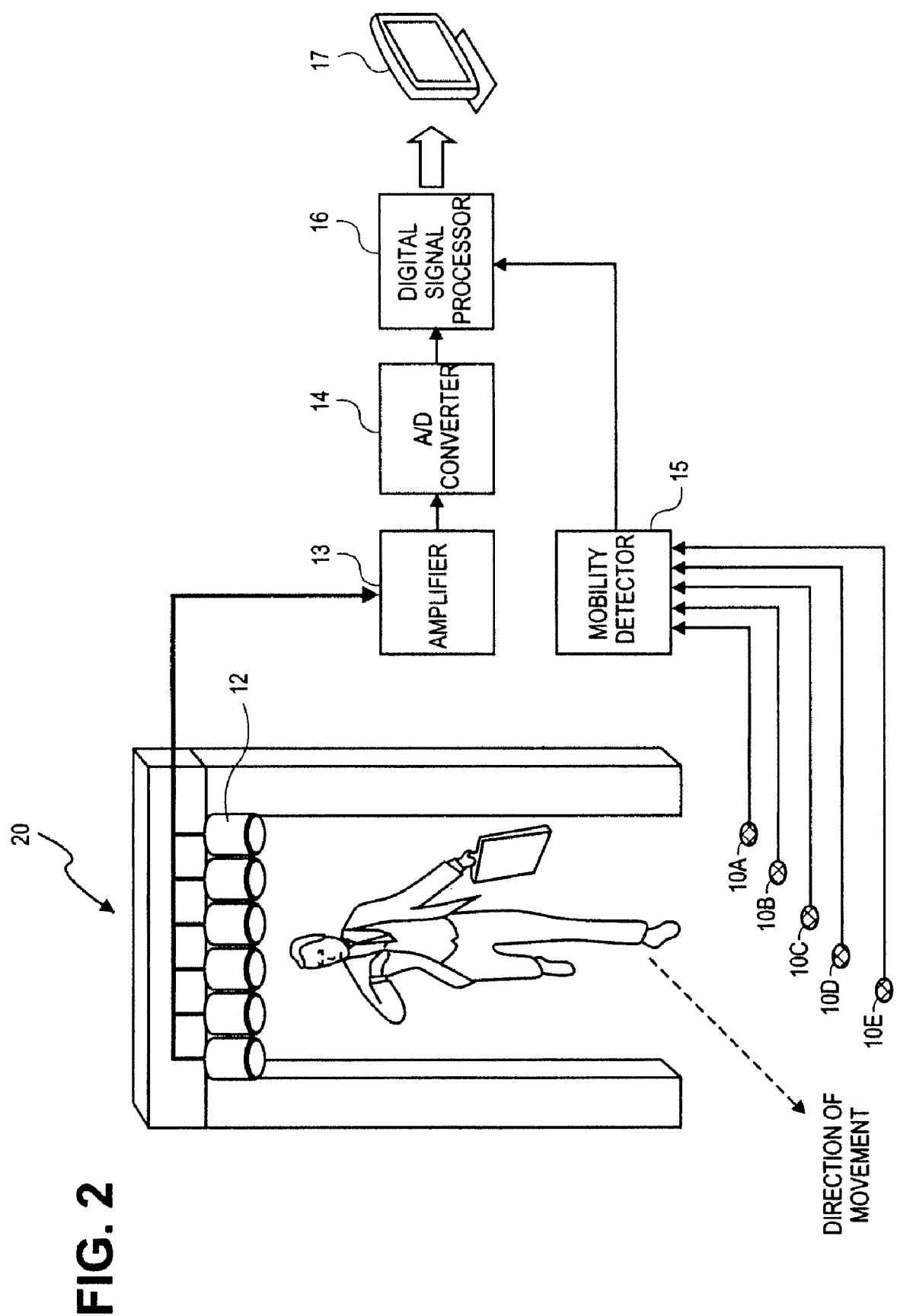
FIG. 2 is an exemplary and conceptual drawing of the concealed object detecting system in accordance with this invention where the passive millimeter wave image sensors are installed horizontally.

FIG. 2 shows a conceptual drawing of a concealed object scanner using the passive millimeter wave image sensor module in accordance with the invention which is installed with said modules (12) in a row in vertical or horizontal direction of the scanner (20), while other characteristics are the same as those in the FIG. 1.

In the FIG. 2, 10C, 10D, and 10E are human body detector sensors.

Figure 3:
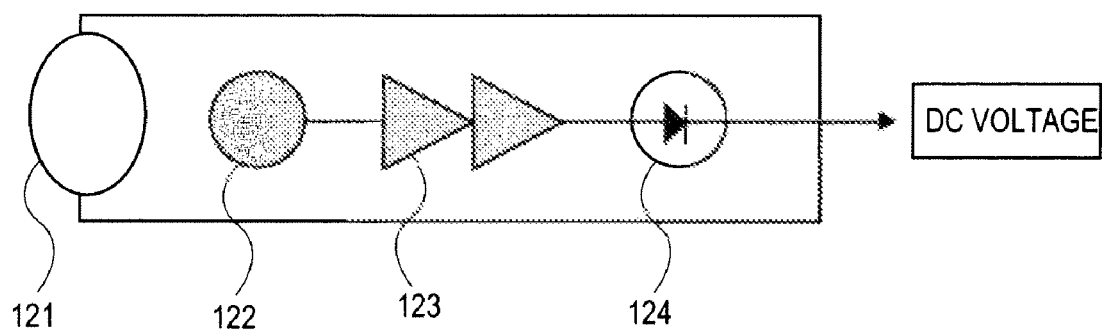
FIG. 3 shows the conceptual structure of the passive millimeter wave image sensor module which converges millimeter wave using a lens, in accordance with this invention.

FIG. 3 shows a conceptual drawing of the passive millimeter wave image sensor module in accordance with the invention which converges millimeter waves with lens. The system consists with; an antenna (122) which receives millimeter waves radiated by temperature with a lens (121); a low noise amplifier (123) which amplifies the signal received with said antenna (122) to a certain level, and; a converter (124) which converts the signals amplified with said amplifier (123) into DC voltage.

Figure 4:
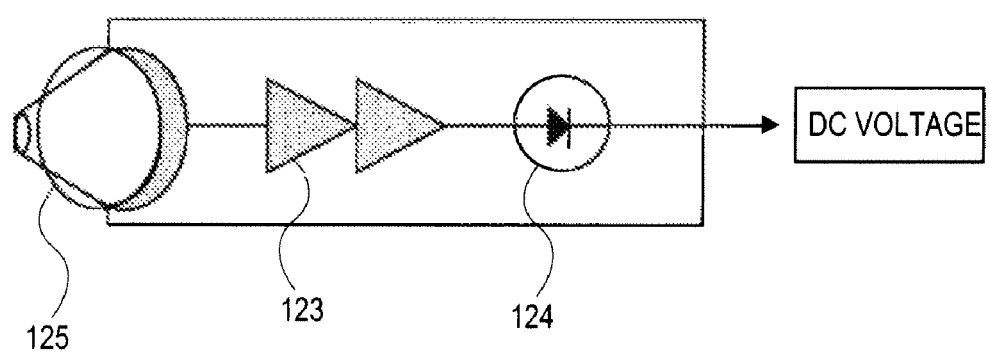
FIG. 4 shows the conceptual structure of the passive millimeter wave image sensor module which receives the millimeter waves parallel with the aperture of a Cassegrain antenna, in accordance with this invention.

FIG. 4 shows a conceptual drawing of the passive millimeter wave image sensor module in accordance with the invention which receives the millimeter waves which are parallel with the aperture of a Cassegrain antenna, which consists with; a Cassegrain antenna (125) which receives millimeter waves radiated by temperature; a low noise amplifier (123) which amplifies the signal received with said Cassegrain antenna (125) to a certain level, and; a converter (124) which converts the signals amplified with said amplifier (123) into DC voltage.

Said Cassegrain antenna (125) which consists with two reflectors (principal and supplementary) whose confocal points are virtual focal points.

Figure 5:
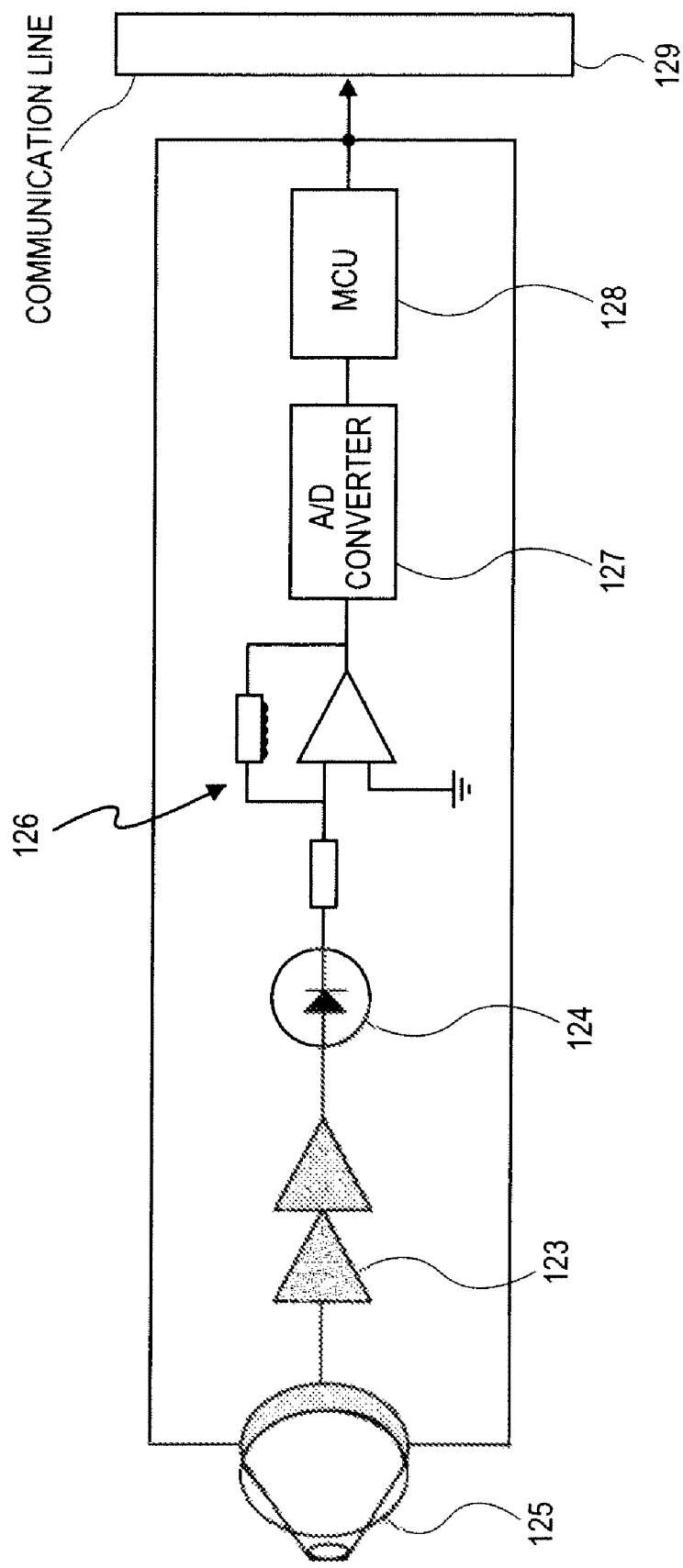
FIG. 5 shows the conceptual structure of the passive millimeter wave image sensor module which using RS-485 communication protocol which is easy for expansion, in accordance with this invention.

FIG. 5 shows a conceptual drawing of the passive millimeter wave image sensor module in accordance with the invention using the RS-485 communication protocol which is easily scalable, consists with; a Cassegrain antenna (125) which receives the millimeter waves radiated by temperature; a low noise amplifier (123) which amplifies the signal received with said Cassegrain antenna (125) to a certain level; a converter (124) which converts the signals amplified with said amplifier (123) into DC voltage; an OP amplifier (126) which amplifies the DC voltage from said converter (124) to a certain level; an A/D converter which converts the DC voltage of said OP amplifier (126) into digital signals; and a micro-controller (MCU) (128) which processes the digital signals from said A/D converter (127) for RS-485 communication protocol which is easily scalable.

The functions and their effects of said members are described herein below with reference to the FIG. 6.

As shown in the FIG. 1, the human body detector senses (10A, 10B) detect coming in and out of human bodies from scanner (20) and send the signals to the mobility sensor (15), which synchronizes the signals from the passive millimeter wave image sensor modules (12) which are arranged on the scanner (20) in a row in vertical or horizontal direction to acquire the millimeter waves (25 GHz~300 GHz) from the human body passing through the scanner (20) in vertical direction at certain time intervals with the digital signal processor (16).

Said digital signal processor (16) processes the signals obtained with said passive millimeter wave image sensor modules (12) from the human body moving through the scanner at the positions where said human body sensors (10A, 10B) are operated during the time of passing, into the image of the object.

In addition, the digital signal processor improves the resolution of the image by signal and image processing, and outputs the signals to said monitor (17).

The passive millimeter wave concealed object detector system in accordance with this invention is not a newly developed system, but can implement a real-time-based passive millimeter wave imaging system by simply adding said passive millimeter wave concealed object detector system.

A real-time-based passive millimeter wave imaging system can be implemented by arranging said passive millimeter wave concealed object detector devices in series in the direction of the movement of object and process the images obtained during the passage of the object with a digital signal processor (16) to display animated images on a monitor on real-time basis.

In the FIG. 1, the passive millimeter wave image sensor modules (12) are arranged on the scanner (20) in vertical direction, however, the passive millimeter wave image sensor modules (12) can be installed on the scanner (20) too.

In addition, the passive millimeter wave image sensor modules (12) in accordance with the present invention, as shown in Fig, 3 and FIG. 4, receives millimeter waves radiated by temperature with an antenna (122) with a lens (121) or a Cassegrain antenna (125) which receives parallel millimeter waves, amplifies the received signals with a low noise amplifier (123), and converts the amplified signals to DC voltage with a converter (24).

FIG. 5 shows an exemplary amplifier (13) implemented with an OP amplifier (26) which amplifies the DC voltage obtained with the passive millimeter wave image sensor modules (12).

The A/D converter (14) converts the DC voltage from the amplifier (13) into digital signals.

In addition, as shown in FIG. 5, a micro-processor unit (MCU) (128) controls the digital signals from the A/D converter (127) for RS-495 communication protocol which is easily scalable.

Figure 6:
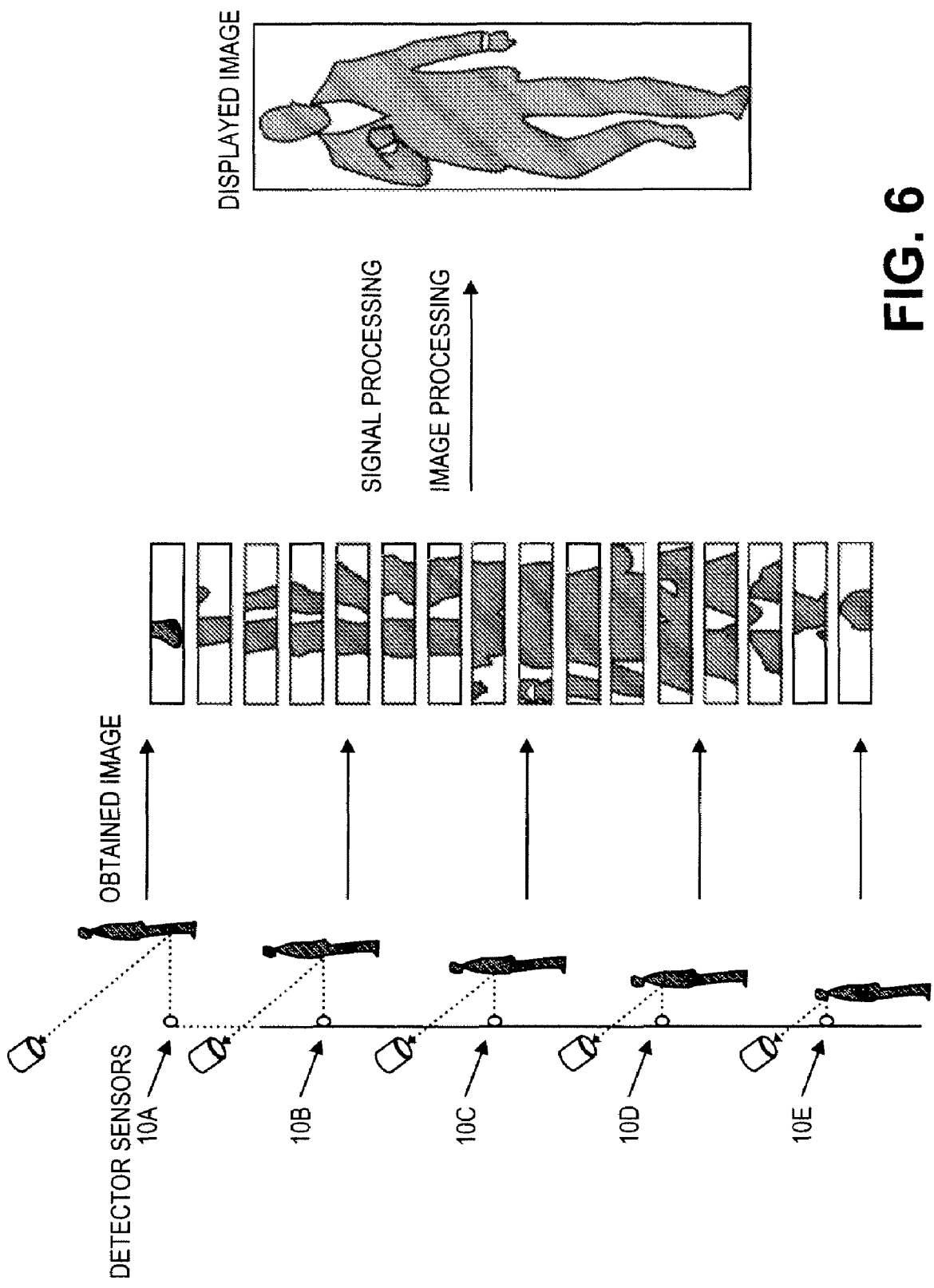
FIG. 6 is an exemplary and conceptual drawing of image construction in accordance with this invention.

FIG. 6 is a conceptual diagram of the image construction in accordance with the present invention. Multiple sensors (10A~10E) are arranged at the positions desired to obtain partial images of human body (object).

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Conventional soft X-ray scanner systems may infringe privacy by showing clear image of human bodies under clothes and may affect health with the X-ray. However, the real time imaging expandable passive millimeter wave system for detecting concealed objects is free from such problems because the system makes use of the millimeter waves which are suitable for the objects to be detected.

In addition, the system in accordance with the present invention does not require any new devices but can provide real-time-based images by simply adding the passive millimeter wave detection device.

In addition, real-time-based passive millimeter wave animated images can be implemented on display monitors by arranging the passive millimeter wave detector devices in accordance with the present invention in a series in the direction of the movement of the object and processing the obtained images during the passage of the object with a digital signal processor.

What is claimed is:

1. A real time imaging expandable passive millimeter wave system for detecting concealed objects comprised of;
   human body detector sensors (10A, 10B) which detect human bodies passing a scanner (20);
   passive millimeter wave image sensor modules (12) which are arranged horizontally or vertically on the scanner (20) to acquire millimeter wave images radiated from human body in vertical axes at certain time intervals;
   an amplifier (13) which amplifies the DC voltage from said passive millimeter image sensor modules (12) to a certain level;
   an analog-digital (A/D) converter (14) which transforms the DC voltage amplified with said amplifier (13) to digital signals;
   a mobility detector (15) which detects the movement of a human body passing a predetermined position to acquire millimeter wave signals from a divided part of the human body;
   a digital signal processor (16) which processes signals obtained by said passive millimeter image sensor modules (12), with a time and position of the divided part obtained from said mobility detector (15) and;
   a monitor which displays the signals processed by said digital signal processor (16).

2. A real time imaging expandable passive millimeter wave system for detecting concealed objects in accordance with claim 1, wherein said passive millimeter wave image sensor modules (12) are characterized by being arranged in horizontal direction on said scanner (20) to obtain the millimeter waves images of the human body passing through the scanner (20) in horizontal direction at certain time intervals.

3. A real time imaging expandable passive millimeter wave system for detecting concealed objects in accordance with claim 1, wherein said passive millimeter wave image sensor modules (12) are characterized by being comprised with; an antenna (122) which has a lens (121) which receives only the millimeter waves radiated by temperature from specific part of human body; a low noise amplifier (123) which amplifies the signal received with said antenna (122) to a certain level, and; a converter (124) which converts the signal amplified with said amplifier (123) into DC voltage.

4. A real time imaging expandable passive millimeter wave system for detecting concealed objects in accordance with claim 3, wherein said passive millimeter wave image sensor modules (12) are characterized by being comprised with; a Cassegrain antenna (125) which receives only the millimeter waves radiated by temperature from specific part of human body; a low noise amplifier (123) which amplifies the signal received with said Cassegrain antenna (125) to a certain level, and; a converter (124) which converts the signal amplified with said amplifier (123) into DC voltage.

5. A real time imaging expandable passive millimeter wave system for detecting concealed objects in accordance with claim 1, wherein said passive millimeter wave image sensor modules (12) are characterized by being comprised with; a Cassegrain antenna (125) which receives only the millimeter waves radiated by temperature from specific part of human body; a low noise amplifier (123) which amplifies the signal received with said Cassegrain antenna (125) to a certain level, and; a converter (124) which converts the signal amplified with said amplifier (123) into DC voltage.

6. A real time imaging expandable passive millimeter wave system for detecting concealed objects in accordance with claim 1, wherein the system is characterized by using a microcontroller unit (MCU) (128) which processes the digital signals from said A/D converter (127) for RS-485 communication protocol which is easily scalable.

7. A real time imaging expandable passive millimeter wave system for detecting concealed objects in accordance with claim 1, wherein the system is characterized by use of multiple sensors (10A.about.10E) arranged at the desired positions to obtain partial images of human body (object) according to their positions.

* * * * *